United States Patent
Yang et al.

(10) Patent No.: US 8,875,138 B2
(45) Date of Patent: Oct. 28, 2014

(54) COMPUTER SYSTEM AND CONTROL METHOD THEREOF

(75) Inventors: Chia-Chi Yang, New Taipei (TW); Yung-Yen Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 363 days.

(21) Appl. No.: 13/326,263

(22) Filed: Dec. 14, 2011

(65) Prior Publication Data
US 2013/0067477 A1 Mar. 14, 2013

(30) Foreign Application Priority Data
Sep. 14, 2011 (TW) .............................. 100133030 A

(51) Int. Cl.
G06F 9/46 (2006.01)
G06F 9/445 (2006.01)
G06F 9/44 (2006.01)

(52) U.S. Cl.
CPC .... G06F 9/44505 (2013.01); *G06F 2200/1637* (2013.01); *G06F 9/4443* (2013.01)
USPC ...................................................... 718/100

(58) Field of Classification Search
None
See application file for complete search history.

(56) References Cited

U.S. PATENT DOCUMENTS

2005/0062715 A1* 3/2005 Tsuji et al. .................... 345/158
2008/0129666 A1* 6/2008 Shimotono et al. ............ 345/87

FOREIGN PATENT DOCUMENTS

TW I287204 9/2007
TW 201019215 5/2010

OTHER PUBLICATIONS

"Office Action of Taiwan Counterpart Application", issued on Jan. 20, 2014, with English translation thereof, p. 1-p. 15.

* cited by examiner

*Primary Examiner* — Mengyao Zhe
(74) *Attorney, Agent, or Firm* — Jianq Chyun IP Office

(57) ABSTRACT

A computer system and a control method thereof are provided, wherein the computer system comprises an embedded controller (EC), a basic input/output system (BIOS), and an operating system (OS). In the method, when the computer system is rotated, the EC makes the BIOS identify a present rotation state of the computer system by an interrupt signal and an internal communication scheme. Then, the BIOS establishes a data structure in accordance with a virtual scan code and the rotation state, and then transmits the data structure to the OS. After that, the OS controls a program installed in the computer system to execute a related operation of the rotation state according to the data structure.

23 Claims, 6 Drawing Sheets

| Rotation state | 0° | 90° | 180° | 270° |
|---|---|---|---|---|
| Rotation parameter | 1 | 2 | 3 | 4 |

COMPUTER SYSTEM AND CONTROL METHOD THEREOF

CROSS-REFERENCE TO RELATED APPLICATION

This application claims the priority benefit of Taiwan application serial no. 100133030, filed on Sep. 14, 2011. The entirety of the above-mentioned patent application is hereby incorporated by reference herein and made a part of this specification.

BACKGROUND OF THE INVENTION

1. Field of the Invention

The present invention relates to a control method of a computer system, and more particularly to a control method based on a rotation state of a computer system and a computer system using the same.

2. Description of Related Art

The vigorous development of computer industry brings about the continuous increasing of the popularization of computer system. Modern people are getting used to handling office works, study or enjoy entertainment by the computer. To enjoy the convenience of the computer system at any time, a notebook computer or a tablet PC having both the functionality and portability attracts the attention of the consumers. Especially, the tablet PC has a small volume and light weight and thus is highly popular.

Generally speaking, the size of the tablet PC may be designed to fit holding by one hand of a user, so the user can grab the stylus by the other hand or operate the tablet PC with fingers of the other hand with ease. In some using situations, the user may place the tablet PC on a desk or on a lap and even more an input device like a mouse or a keyboard may be additionally plugged to add the convenience of input.

For a computer system manufacturer, in the environment of peer competitors and keen competition on the market, when the computer system manufacturer develops new products, it is an important goal to improve the market share by increasing the functionality to create the competitive strength in consideration of the using requirements of the consumers.

SUMMARY OF THE INVENTION

Accordingly, the present invention is directed to a computer system and a control method thereof, which can automatically execute a related operation according to a present rotation state of the computer system.

The present invention provides a control method of a computer system, in which the computer system includes an embedded controller (EC), a basic input/output system (BIOS) and an operating system (OS). In the method, when the computer system is rotated, the EC makes the BIOS identify a present rotation state of the computer system by an interrupt signal and an internal communication scheme. Then, the BIOS establishes a data structure in accordance with a virtual scan code and the rotation state, and then transmits the data structure to the OS. After that, the OS controls a program to execute a related operation of the rotation state according to the data structure.

In an embodiment of the present invention, the control method of the computer system further includes acquiring the present rotation state of the computer system when a motion sensor detects that the computer system is rotated and transmitting a signal corresponding to the rotation state to the EC.

In an embodiment of the present invention, the internal communication scheme is provided by a first specific address range in a main memory of the computer system defined by the BIOS when the computer system starts running. The step that the EC makes the BIOS identify the rotation state by the interrupt signal and the internal communication scheme includes parsing the signal of the motion sensor by the EC to determine the present rotation state of the computer system, writing a virtual scan code and a rotation parameter corresponding to the rotation state into the first specific address range, and sending an interrupt signal to the BIOS to inform the BIOS of reading the first specific address range to acquire the virtual scan code and the rotation parameter.

In an embodiment of the present invention, the internal communication scheme is provided by a second specific address range in an internal memory of the EC, and the control method of the computer system further includes determining the present rotation state of the computer system by the EC in accordance with the specific key input when the computer system receives a specific key input, and writing the virtual scan code and the rotation parameter corresponding to the rotation state of the computer system into the second specific address range.

In an embodiment of the present invention, the step that the EC makes the BIOS identify the rotation state by the interrupt signal and the internal communication scheme includes the OS commanding the EC by the BIOS to read the second specific address range in accordance with the interrupt signal sent by the EC and then the EC returning the virtual scan code and the rotation parameter recorded in the second specific address range to the BIOS.

In an embodiment of the present invention, the step of establishing by the BIOS the data structure in accordance with the virtual scan code and the rotation state includes establishing by the BIOS the data structure in a buffer area of the main memory of the computer system. The BIOS fills the virtual scan code in a first preset area of the buffer area and fills the rotation parameter in a second preset area of the buffer area.

In an embodiment of the present invention, the program is a display application, and the step that the OS controls the program to execute the related operation of the rotation state according to the data structure includes that the OS transmits the data structure to the display application. Then, the display application determines the rotation state of the computer system according to the rotation parameter filled in the data structure, and calls a display application interface to rotate a screen image of the computer system in accordance with the rotation state.

In an embodiment of the present invention, the program is a sound card driver, and the step that the OS controls the program to execute the related operation of the rotation state according to the data structure includes transmitting the data structure by the OS to the sound card driver, then determining the rotation state of the computer system by the sound card driver according to the rotation parameter filled in the data structure and informing a sound chip of actuating a first set of microphones or a second set of microphones configured in the computer system in accordance with the rotation state. The first set of microphones is configured on two vertical sides of the computer system when not rotated, and the second set of microphones is configured on two horizontal sides of the computer system when not rotated.

From another point of view, the present invention provides a computer system, which includes an EC, a BIOS, a main memory, a chipset and a processor. The chipset is coupled to the EC, the BIOS, the main memory and the processor. The processor is configured to execute an OS loaded in the main memory. When the computer system is rotated, the EC makes the BIOS identify a present rotation state of the computer system by an interrupt signal and an internal communication scheme, and the BIOS establishes a data structure in accordance with the virtual scan code and the rotation state and then transmits the data structure to the OS. The OS controls a program to execute a related operation of the rotation state according to the data structure.

In an embodiment of the present invention, the BIOS defines a first specific address range in the main memory when the computer system starts running to serve as the internal communication scheme.

In an embodiment of the present invention, the computer system further includes a motion sensor, which is coupled to the EC. When the motion sensor detects that the computer system is rotated, the motion sensor acquires the present rotation state of the computer system and transmits a signal corresponding to the rotation state to the EC.

In an embodiment of the present invention, the EC parses the signal of the motion sensor to determine the present rotation state of the computer system, writes a virtual scan code and a rotation parameter corresponding to the rotation state into the first specific address range, and sends an interrupt signal to the BIOS to inform the BIOS of reading the first specific address range to acquire the virtual scan code and the rotation parameter.

In an embodiment of the present invention, the EC defines a second specific address range in an internal memory to serve as the internal communication scheme.

In an embodiment of the present invention, the computer system further includes a keyboard, which is coupled to the EC. When the computer system receives a specific key input of the keyboard, the EC determines the present rotation state of the computer system in accordance with the specific key input and writes a virtual scan code and the rotation parameter corresponding to the rotation state into the second specific address range.

In an embodiment of the present invention, the OS commands the EC by the BIOS to read the second specific address range in accordance with the interrupt signal sent by the EC. Then, the EC returns the virtual scan code and the rotation parameter recorded in the second specific address range to the BIOS.

In an embodiment of the present invention, the BIOS fills the virtual scan code in a first preset area of the buffer area and fills the rotation parameter in a second preset area of the buffer area, and the buffer area is taken from the main memory.

In an embodiment of the present invention, the program is a display application, and the OS transmits the data structure to the display application, so that the display application determines the rotation state of the computer system according to the rotation parameter filled in the data structure, and calls a display application interface to rotate a screen image of the computer system in accordance with the rotation state.

In an embodiment of the present invention, the program is a sound card driver, and the OS transmits the data structure to the sound card driver, then the sound card driver determines the rotation state of the computer system according to the rotation parameter filled in the data structure and informs a sound chip of actuating a first set of microphones or a second set of microphones configured in the computer system in accordance with the rotation state. The first set of microphones is configured on two vertical sides of the computer system when not rotated, and the second set of microphones is configured on two horizontal sides of the computer system when not rotated.

Based on the above description, in the present invention, when the computer system is rotated, the OS acquires the present rotation state by the internal communication scheme and the virtual scan code, and then controls a program to automatically execute the related operation of the rotation state. In this manner, the computer system automatically operates in accordance with the rotation state, thereby improving the convenience of the computer system.

In order to make the features and advantages of the present invention clearer and more comprehensible, the present invention is described in detail below with reference to embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
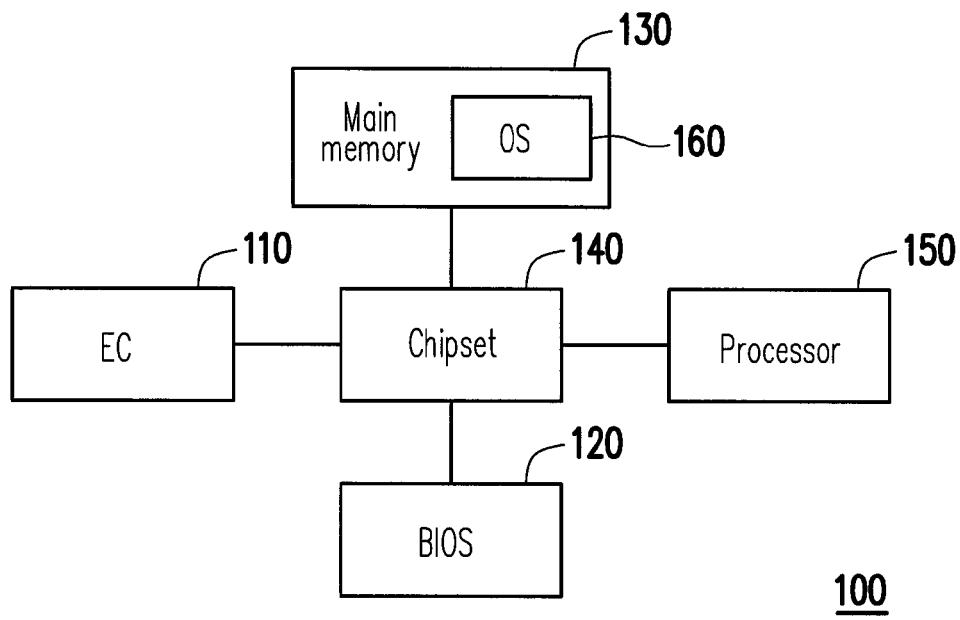
FIG. 1 is a block view of a computer system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block view of a computer system according to an embodiment of the present invention. Referring to FIG. 1, the computer system 100 includes an EC 110, a BIOS 120, a main memory 130, a chipset 140 and a processor 150. The computer system 100 is for example a notebook computer, a tablet PC or any portable electronic device, and the category of the computer system 100 is not particularly limited herein.

The EC 110 is responsible for managing a power source of the computer system 100, and is configured to manage an input device such as a keyboard or a touch pad. In this embodiment, the EC 110 is for example a keyboard controller (KBC).

The BIOS 120 is an interface between software and hardware of the computer system 100 and meanwhile is a startup procedure of the computer system 100. For example, after the power source of the computer system 100 is turned on, a power on self test (POST) is executed. In detail, the BIOS 120 is a program code recorded in a read-only memory (ROM) (not shown).

The main memory 130 may be a dynamic random access memory (DRAM) or a static random access memory (SRAM), and the category of the main memory 130 is not particularly limited herein. The main memory 130 is configured to load all sorts of program and data for the processor 150 to execute and use.

The chipset 140 is coupled to the EC 110, the BIOS 120, the main memory 130 and the processor 150 respectively. The chipset 140 is mainly responsible for communication between all sorts of hardware in the computer system 100. In an embodiment, the chipset 140 includes a south bridge chip and a north bridge chip. The south bridge chip is configured to connect the EC 110, the BIOS 120, and peripheral equipment with low speed, and the north bridge chip connects the components with high speed such as the main memory 130 and the processor 150.

The processor 150 is for example a central processing unit (CPU), and is responsible for controlling and managing the overall operation of the computer system 100. In detail, the processor 150 executes an OS 160 loaded in the main memory 130, which enables the user to interact with the computer system 100 by the OS 160.

Figure 2:
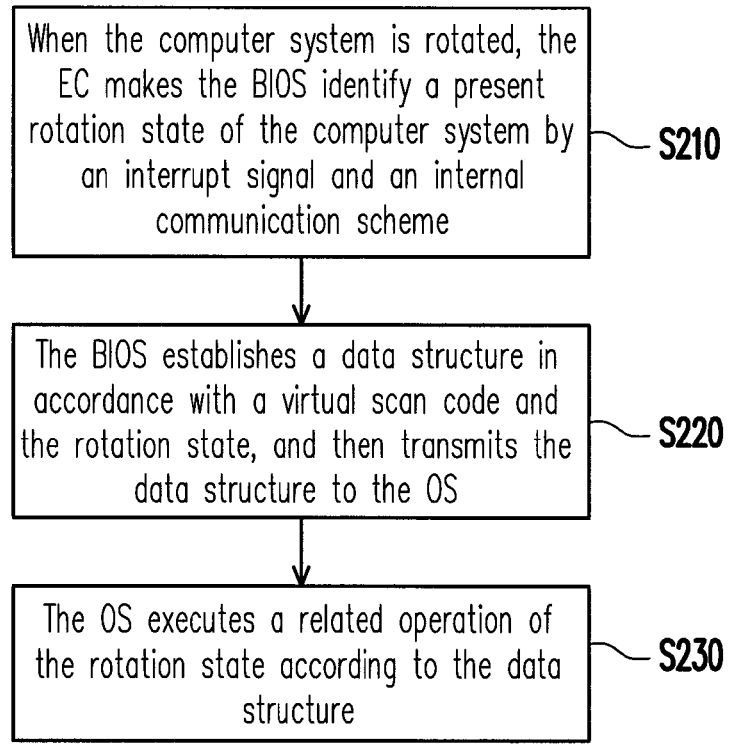
FIG. 2 is a flow chart of a control method of a computer system according to an embodiment of the present invention.

Hereinafter, the details about the flow of the control method of the computer system of the present invention will be illustrated with another embodiment in accompanying with FIG. 1. FIG. 2 is a flow chart of a control method of a computer system according to an embodiment of the present invention, and refer to FIG. 1 and FIG. 2 together.

Firstly, in Step S210, when the computer system 100 is rotated, the EC 110 makes the BIOS 120 identify a present rotation state of the computer system 100 by an interrupt signal and an internal communication scheme. The details of the internal communication scheme will be illustrated with reference to the drawings later. It should be explained that in this embodiment, to rotate the computer system 100 refers to rotating the whole computer system 100. In another embodiment, if the computer system 100 is constituted by of a plurality of parts, to rotate the computer system 100 may also refer to rotating some parts (for example, only the display part for exhibiting images is rotated).

Figures 3, 4:
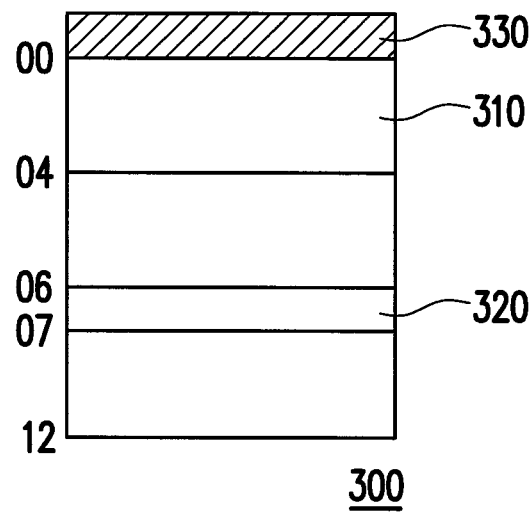
FIG. 3 is a schematic view of a data structure according to an embodiment of the present invention.
FIG. 4 is a schematic view of a correspondence relation of a rotation state and a rotation parameter according to an embodiment of the present invention.

Then, in Step S220, the BIOS 120 establishes a data structure in accordance with a virtual scan code and the present rotation state of the computer system 100, and then transmits the data structure to the OS 160. The virtual scan code is a preset identification code denoting that the computer system 100 is rotated, whose length may be 3 bytes. The BIOS 120 establishes the data structure in a buffer area of the main memory 130, and the buffer area may be configured in advance or acquired dynamically when required. FIG. 3 is a schematic view of a data structure according to an embodiment of the present invention. In this embodiment, the buffer area 300 includes a storage area between addresses 00 to 12. The addresses 00 to 04 are defined to be the first preset area 310, and the addresses 06 to 07 are defined to be the second preset area 320. When the BIOS 120 establishes the data structure, the BIOS 120 fills the virtual scan code in the first preset area 310 and fills the rotation parameter corresponding to the rotation state in the second preset area 320. In addition, the BIOS 120 may generate a header 330 of the data structure to record the relevant information such as a real memory address of the buffer area 300. FIG. 4 is a schematic view of a correspondence relation of a rotation state and a rotation parameter according to an embodiment of the present invention. Referring to FIG. 4, in this embodiment, the computer system 100 has 0°, 90°, 180°, and 270° four rotation states, which are respectively corresponding to the rotation parameters 1, 2, 3, 4. For example, when the present rotation state of the computer system 100 is 90°, the BIOS 120 fills the rotation parameter 2 in the second preset area 320.

Back to Step S230 of FIG. 2, after receiving the data structure, the OS 160 forwards the data structure to the program installed in the computer system 100, for controlling the program to execute the related operation of the rotation state according to the data structure. In specific, as the content of the data structure may reflect that the computer system 100 has been rotated and meanwhile figure out the present rotation state, so the program can decide to execute which corresponding operation after the data structure is parsed, and thus the computer system 100 presents the result corresponding to the rotation state.

Hereinafter, the detailed flow of identifying the internal communication scheme adopted when the computer system is rotated and controlling the computer system according to the rotation state will be illustrated in some embodiments.

Figure 5:
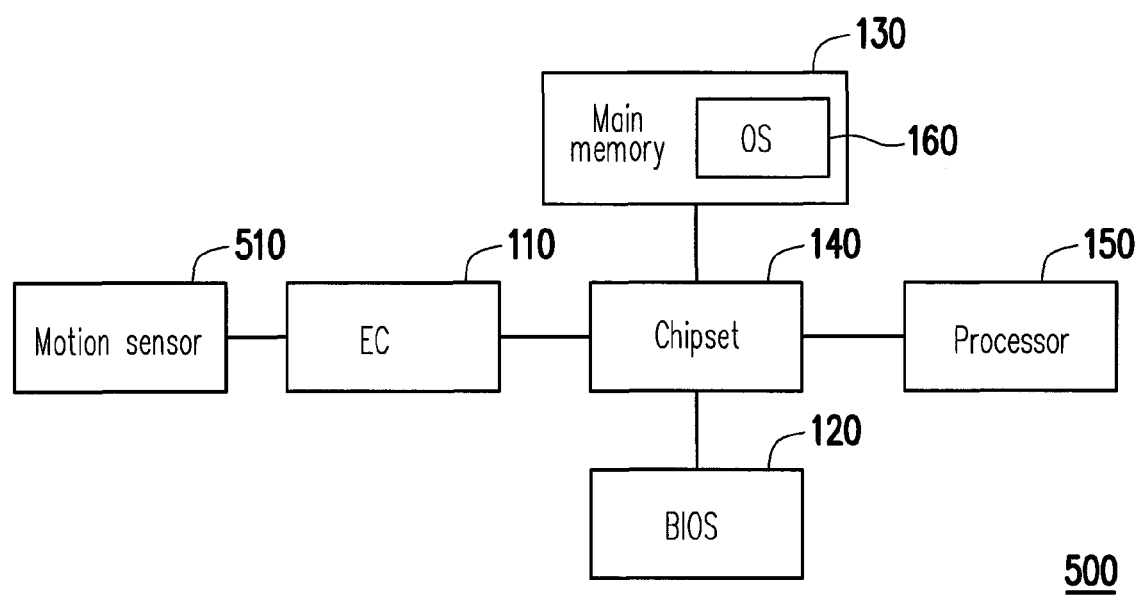
FIG. 5 is a block view of a computer system according to another embodiment of the present invention.

FIG. 5 is a block view of a computer system according to another embodiment of the present invention. As the computer system 500 has the similar architecture of the computer system 100 in FIG. 1, only the difference will be explained hereinafter.

Referring to FIG. 5, in addition to the EC 110, the BIOS 120, the main memory 130, the chipset 140 and the processor 150, the computer system 500 further includes a motion sensor 510 coupled to the EC 110. The motion sensor 510 may be a G-sensor or a gyro meter and is configured to detect if the computer system 500 is rotated and acquire the information such as the rotation angle. When the motion sensor 510 detects that the computer system 500 is rotated, the EC 110 and the BIOS 120 inform the OS 160 of the present rotation state by an internal communication scheme and the virtual scan code, so as to control one or more programs installed in the computer system 500 to execute the corresponding operation.

The internal communication scheme of this embodiment is a mailbox mechanism. In detail, the BIOS 120 designates a block of area in the main memory 130 when the computer system 500 starts running, and defines the first specific address range (the size is 4 bytes) to be the mailbox. The EC 110 and the BIOS 120 are communicated by the first specific address range in the main memory 130. In detail, the EC 110 may write information into the first specific address range for the BIOS 120 to read.

Figure 6:
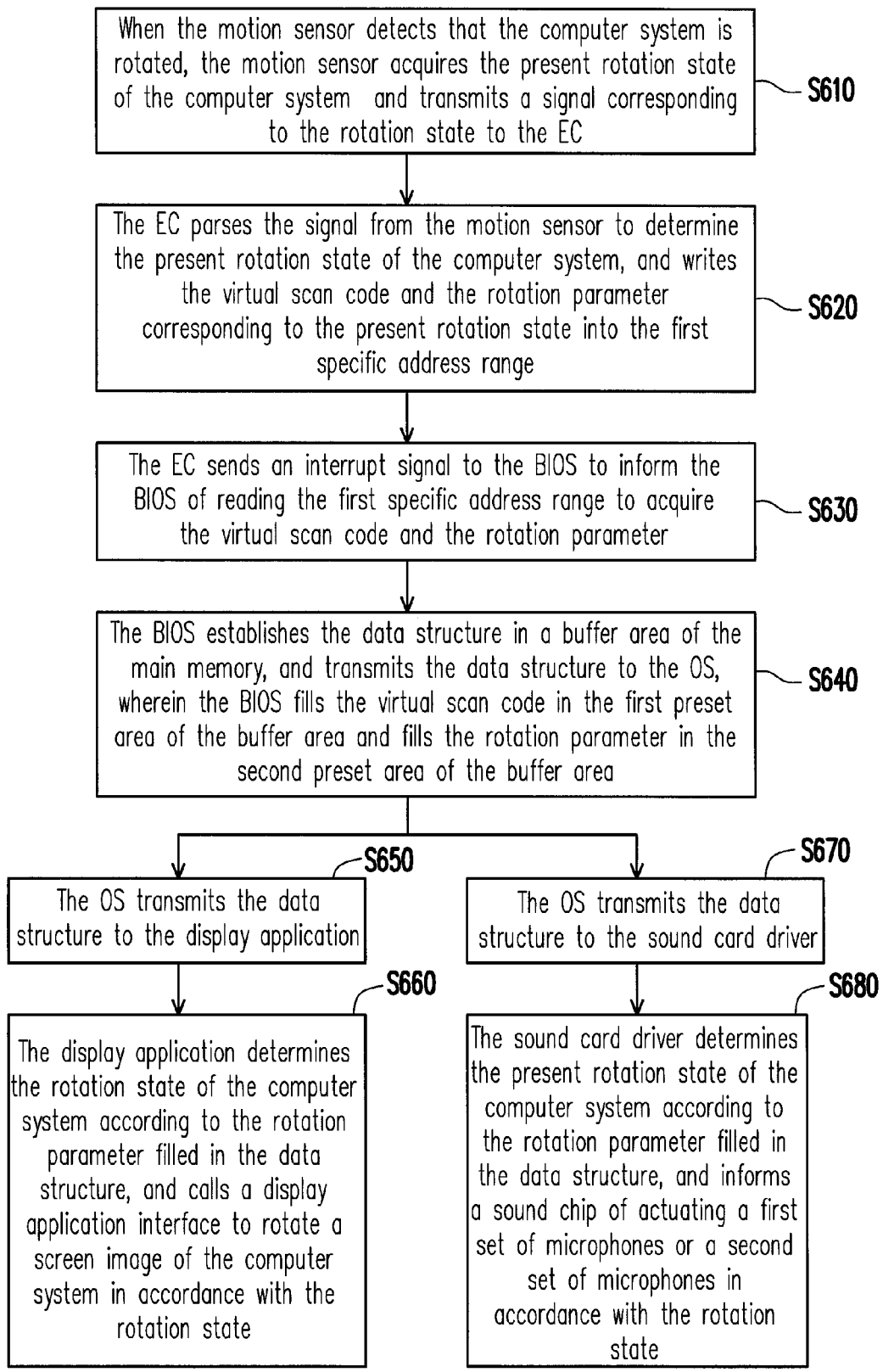
FIG. 6 is a flow chart of a control method of a computer system according to another embodiment of the present invention.

Hereinafter, FIG. 6 is a flow chart of a control method of a computer system 500, and refer to FIG. 5 and FIG. 6 together.

In this embodiment, the motion sensor 510 detects if the computer system 500 is rotated. Firstly, in Step S610, when the motion sensor 510 detects that the computer system 500 is rotated, the motion sensor 510 acquires the present rotation state of the computer system 500 and transmits a signal corresponding to the rotation state to the EC 110. For example, the motion sensor 510 may transmit the signal to the EC 110 by setting a general purpose input/output (GPIO) pin.

Then, in Step S620, the EC 110 parses the signal from the motion sensor 510 to determine the present rotation state of the computer system 500, and writes the virtual scan code indicating that the computer system 500 has been rotated and the rotation parameter corresponding to the present rotation state into the first specific address range in the main memory 130.

Hereinafter, in Step S630, the EC 110 sends an interrupt signal to the BIOS 120 to inform the BIOS 120 of reading the first specific address range to acquire the virtual scan code and the rotation parameter. In this embodiment, the EC 110 may send an interrupt signal to the BIOS 120 by setting a GPIO pin of the chipset 140, and the interrupt signal may be system management interrupt (SMI) or system control interrupt (SCI).

After the BIOS 120 acquires the virtual scan code and the rotation parameter from the first specific address range, in Step S640, the BIOS 120 establishes the data structure in a buffer area of the main memory 130, and transmits the data structure to the OS 160. The BIOS 120 fills the virtual scan code in the first preset area of the buffer area and fills the rotation parameter in the second preset area of the buffer area.

When the OS 160 receives the data structure, the OS 160 forwards the data structure to one or more programs installed in the computer system 500.

In Step S650, the OS 160 transmits the data structure to the display application. Then in Step S660, the display application identifies that the computer system 500 has been rotated according to the virtual scan code in the data structure and may determine the present rotation state of the computer system 500 according to the rotation parameter of the data structure. Accordingly, the display application calls the display application interface (for example, the EnumDisplaySettings application interface provided by the Microsoft OS, or the SetConfiguration application interface provided by the display card) to rotate the screen image of the computer system 500 in accordance with the rotation state. For example, if the rotation state of the computer system 500 is 90°, the display application may call the display application interface to rotate the screen image by 90°, and thus the user may view the content of the screen image at a comfortable angle.

Figure 7:
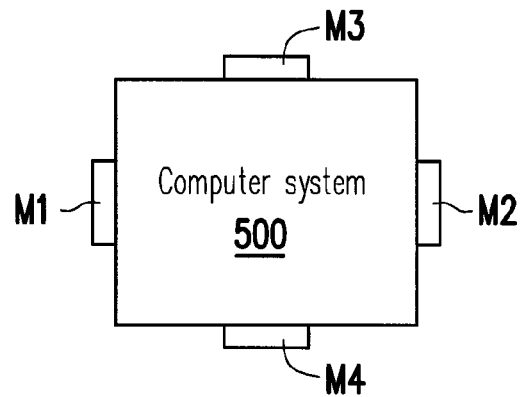
FIG. 7 is a schematic profile view of the computer system when not rotated according to an embodiment of the present invention.

In addition, in Step S670, the OS 160 transmits the data structure to the sound card driver. Then, in Step S680, the sound card driver determines the present rotation state of the computer system 500 according to the rotation parameter of the data structure, and informs a sound chip of actuating a first set of microphones or a second set of microphones in accordance with the rotation state. FIG. 7 is a schematic profile view of the computer system 500 when not rotated according to an embodiment of the present invention (that is, the present rotation state of the computer system 500 is 0°). Referring to FIG. 7, the first set of microphones of this embodiment includes microphones M1 and M2, which are configured on two vertical sides (for example, on the left and right sides respectively) of the computer system 500 when not rotated, and the second set of microphones includes microphones M3 and M4, which are configured on two horizontal sides (for example, on the up and down sides respectively) of the computer system 500 when not rotated. In this embodiment, when the rotation state is 90° or 270°, the sound chip actuates the second set of microphones, and when rotation state is 0° or 180°, the sound chip actuates the first set of microphones. The corresponding set of microphones actuated in accordance with the rotation state allows the user to enjoy a stereo sound effect through the proper microphones after the computer system 500 is rotated.

Figure 8:
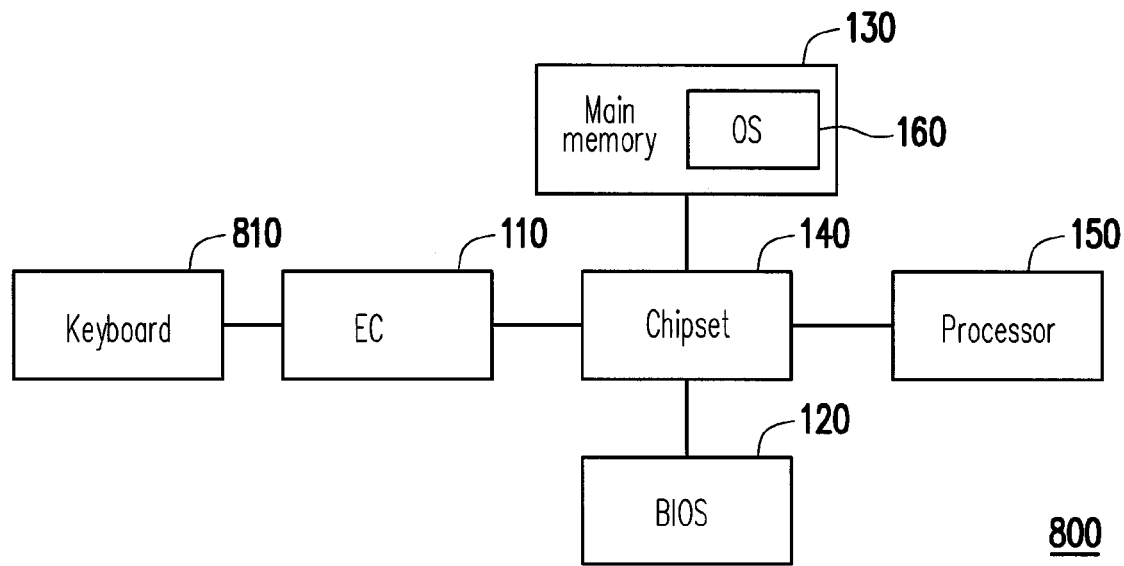
FIG. 8 is a block view of a computer system according to still another embodiment of the present invention.

FIG. 8 is a block view of a computer system according to still another embodiment of the present invention. As the computer system 800 has the similar architecture of the computer system 100 in FIG. 1, only the difference will be explained hereinafter.

Referring to FIG. 8, in addition to the EC 110, the BIOS 120, the main memory 130, the chipset 140 and the processor 150, the computer system 800 further includes a keyboard 810. The keyboard 810 is coupled to the EC 110. In this embodiment, after the user rotates the computer system 800, the user needs to press down a specific composite key (or a specific key) on the keyboard 810 to inform the system of the present rotation state. For example, if the computer system 800 has 0°, 90°, 180°, and 270° four rotation states, which are sequentially corresponding to four specific composite keys composed by the "Alt" and up, left, down, right arrow keys on the keyboard 810. Based on the above, when the EC 110 receives any specific composite key, it indicates that the computer system 800 has been rotated, and the EC 110 and the BIOS 120 inform the OS 160 of the present rotation state by the internal communication scheme and the virtual scan code, so as to control the program in the computer system 800 to execute the corresponding operation.

The internal communication scheme of this embodiment is provided by the second specific address range in the internal memory of the EC 110. Here, the internal memory is for example an embedded controller random access memory (ECRAM), and the size of the second specific address range defined by the EC 110 is 4 bytes.

Figure 9:
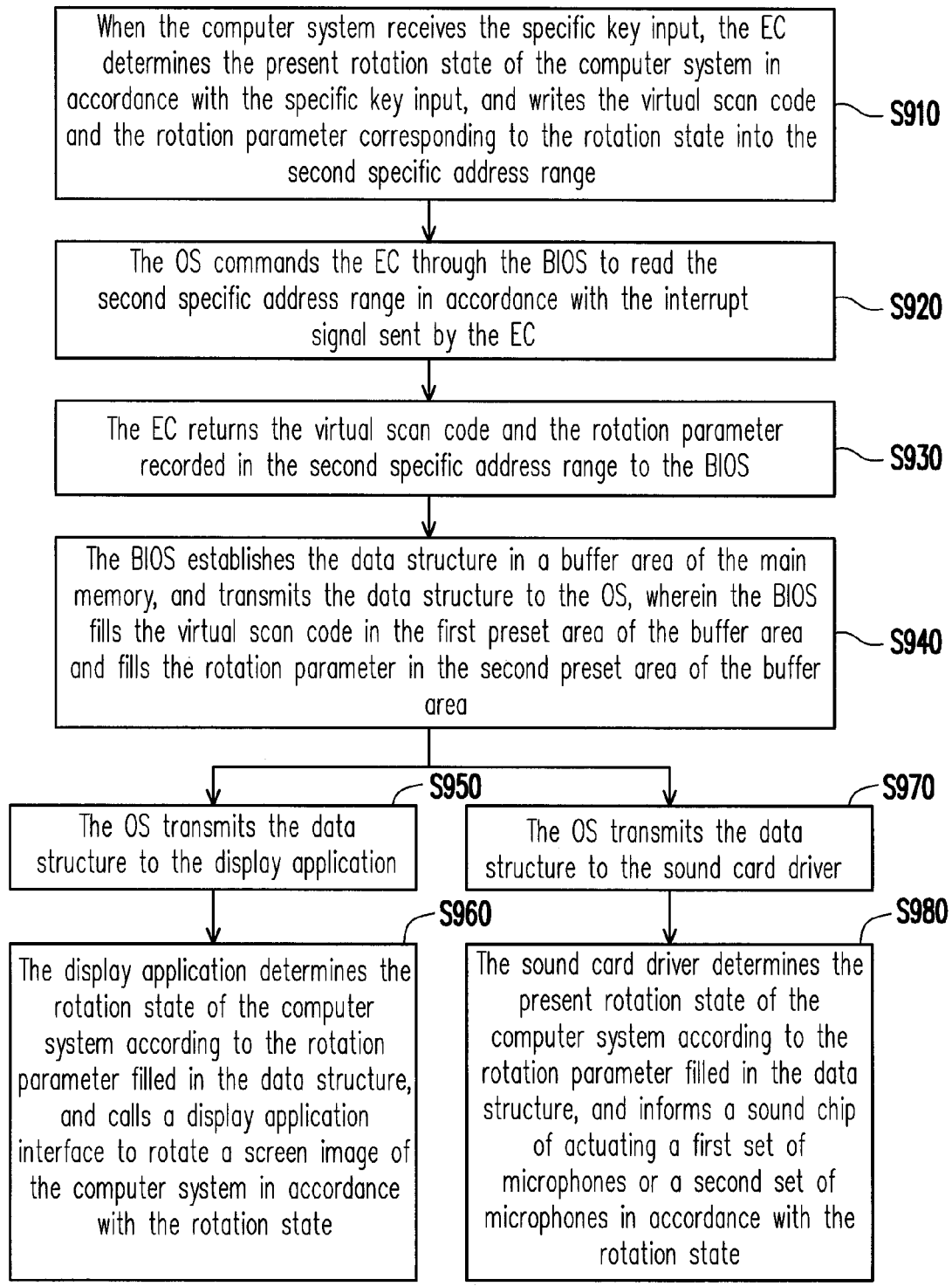
FIG. 9 is a flow chart of a control method of a computer system according to still another embodiment of the present invention.

Hereinafter, FIG. 9 illustrates the detailed flow of the control method of the computer system 800, and refer to FIG. 8 and FIG. 9 together.

Firstly, in Step S910, when the computer system 800 receives the specific key input (for example, the user presses down the specific composite key on the keyboard 810), the EC 110 determines the present rotation state of the computer system 800 in accordance with the specific key input, and writes the virtual scan code indicating that the computer system 800 has been rotated and the rotation parameter corresponding to the rotation state into the second specific address range. For example, when the user presses down the specific composite key composed of the "Alt" and the left arrow key, the EC 110 identifies that the present rotation state of the computer system 800 is 90°, and further writes the virtual scan code and the corresponding rotation parameter (for example, 2) into the second specific address range.

Thereafter, in Step S920, the OS 160 commands the EC 110 through the BIOS 120 to read the second specific address range in accordance with the interrupt signal sent by the EC 110. In more details, after writing the virtual scan code and the rotation parameter into the second specific address range in Step S910, the EC 110 sends the interrupt signal to the BIOS 120, in which the interrupt signal is for example an interrupt request (IRQ). After receiving the interrupt signal, the BIOS 120 sends a software interrupt to the OS 160. Then, when the OS 160 is in a non-busy state, the OS 160 informs the BIOS 120 of acquiring the relevant information of the key input. Now, the BIOS 120 requires the EC 110 to read the information recorded in second specific address range of the internal memory via a specific input/output port (for example, the input/output port of the address 60h) of the EC 110.

Then, in Step S930, the EC 110 returns the virtual scan code and the rotation parameter recorded in the second specific address range to the BIOS 120. In this manner, the BIOS 120 identifies the present rotation state of the computer system 800 in accordance with the rotation parameter.

Hereinafter, Steps S940 to S980 illustrate the detailed flow that the BIOS 120 establishes a data structure according to the virtual scan code and the rotation state, and the OS 160 forwards the data structure to the display application and the sound card driver, so as to control the program to execute the related operation of the rotation state. As the Steps S940 to S980 in FIG. 9 are identical or similar to the Steps S640 to S680 in FIG. 6, so the details will not be repeated herein again.

It should be particularly noted that in the embodiments of FIG. 6 and FIG. 9, once the computer system is rotated, the screen image of the computer system and the set of microphones configured to play sound can be switched corresponding to the rotation state. However, in another embodiment of the present invention, the OS may only transmit the data structure to the display application and rotate the screen image merely in accordance with the rotation state. Alternatively, the OS may only transmit the data structure to the sound card driver and change the set of microphones ought to be actuated merely in accordance with the rotation state.

Although in the embodiments, the display application and the sound card driver are taken as an example for illustrating the present invention, the present invention should not be limited to this. In other words, the OS may transmit the data structure received from the BIOS to any program installed in the computer system, so as to control the program to generate the corresponding result in accordance with different rotation states of the computer system.

In view of the above, in the computer system and the control method thereof of the present invention, the preset virtual scan code indicates that the computer system is rotated, and the OS identifies the present rotation state of the computer system by the internal communication scheme, thereby controlling the program to execute the operation corresponding to the rotation state. Accordingly, after the user rotates the computer system, the computer system may automatically exhibit different results in accordance with the rotation state, thereby improving the convenience of the follow-up operation after the computer system is rotated by the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control method of a computer system, wherein the computer system comprises an embedded controller (EC), a basic input/output system (BIOS) and an operating system (OS), the method comprising:
   when the computer system is rotated, making, by the EC, the BIOS identify a present rotation state of the computer system by an interrupt signal and an internal communication scheme;
   establishing, by the BIOS, a data structure in accordance with a virtual scan code and the rotation state and transmitting the data structure to the OS, wherein the virtual scan code is a preset identification code denoting that the computer system is rotated; and
   controlling, by the OS, a program to execute a related operation of the rotation state in accordance with the data structure,
   wherein the internal communication scheme is provided by a first specific address range in a main memory of the computer system defined by the BIOS when the computer system starts running, and the step of making, by the EC, the BIOS identify the rotation state by the interrupt signal and the internal communication scheme comprises:
   writing, by the EC, the virtual scan code and a rotation parameter corresponding to the rotation state into the first specific address range; and
   sending, by the EC, the interrupt signal to the BIOS to inform the BIOS of reading the first specific address range and acquiring the virtual scan code and the rotation parameter.

2. The control method of the computer system according to claim 1, further comprising:
   when a motion sensor detects that the computer system is rotated, acquiring the present rotation state of the computer system; and
   transmitting, by the motion sensor, a signal corresponding to the rotation state of the computer system to the EC.

3. The control method of the computer system according to claim 2, wherein the step of making, by the EC, the BIOS identify the rotation state by the interrupt signal and the internal communication scheme comprises:
   parsing, by the EC, the signal from the motion sensor to determine the present rotation state of the computer system.

4. The control method of the computer system according to claim 1, wherein the internal communication scheme is provided by a second specific address range in an internal memory of the EC, and the method further comprises:
   when the computer system receives a specific key input, determining, by the EC, the present rotation state of the computer system in accordance with the specific key input; and
   writing, by the EC, the virtual scan code and a rotation parameter corresponding to the rotation state of the computer system into the second specific address range.

5. The control method of the computer system according to claim 4, wherein the step of making, by the EC, the BIOS identify the rotation state by the interrupt signal and the internal communication scheme comprises:
   the OS commanding the EC through the BIOS to read the second specific address range in accordance with the interrupt signal sent by the EC; and
   the EC returning the virtual scan code and the rotation parameter recorded in the second specific address range to the BIOS.

6. The control method of the computer system according to claim 3, wherein the step of establishing the data structure in accordance with the virtual scan code and the rotation state by the BIOS comprises:
   establishing, by the BIOS, the data structure in a buffer area of the main memory of the computer system, wherein the BIOS fills the virtual scan code in a first preset area of the buffer area and fills the rotation parameter in a second preset area of the buffer area.

7. The control method of the computer system according to claim 6, wherein the program is a display application, and the step that the OS controls the program to execute the related operation of the rotation state in accordance with the data structure comprises:
   transmitting, by the OS, the data structure to the display application;
   determining, by the display application, the rotation state of the computer system in accordance with the rotation parameter filled in the data structure; and
   calling, by the display application, a display application interface to rotate a screen image of the computer system in accordance with the rotation state.

8. The control method of the computer system according to claim 6, wherein the program is a sound card driver, and the step that the OS controls the program to execute the related operation of the rotation state in accordance with the data structure comprises:
   transmitting, by the OS, the data structure to the sound card driver;
   determining, by the sound card driver, the rotation state of the computer system according to the rotation parameter filled in the data structure; and informing, by the sound card driver, a sound chip of actuating a first set of microphones or a second set of microphones configured in the computer system in accordance with the rotation state, wherein the first set of microphones is configured on two vertical sides of the computer system when not rotated and the second set of microphones is configured on two horizontal sides of the computer system when not rotated.

9. The control method of the computer system according to claim 5, wherein the step of establishing the data structure in accordance with the virtual scan code and the rotation state by the BIOS comprises:

establishing, by the BIOS, the data structure in a buffer area of the main memory of the computer system, wherein the BIOS fills the virtual scan code in a first preset area of the buffer area and fills the rotation parameter in a second preset area of the buffer area.

10. The control method of the computer system according to claim 9, wherein the program is a display application, and the step that the OS controls the program to execute the related operation of the rotation state in accordance with the data structure comprises:

transmitting, by the OS, the data structure to the display application;

determining, by the display application, the rotation state of the computer system in accordance with the rotation parameter filled in the data structure; and calling, by the display application, a display application interface to rotate a screen image of the computer system in accordance with the rotation state.

11. The control method of the computer system according to claim 9, wherein the program is a sound card driver, and the step that the OS controls the program to execute the related operation of the rotation state in accordance with the data structure comprises:

transmitting, by the OS, the data structure to the sound card driver;

determining, by the sound card driver, the rotation state of the computer system according to the rotation parameter filled in the data structure; and informing, by the sound card driver, a sound chip of actuating a first set of microphones or a second set of microphones configured in the computer system in accordance with the rotation state, wherein the first set of microphones is configured on two vertical sides of the computer system when not rotated and the second set of microphones is configured on two horizontal sides of the computer system when not rotated.

12. A computer system, comprising:
an embedded controller (EC);
a basic input/output system (BIOS), recorded in a memory;
a main memory;
a chipset, coupled to the EC, the memory and the main memory; and
a processor, coupled to the chipset and executing the BIOS and an operating system (OS) loaded in the main memory,
wherein when the computer system is rotated, the EC makes the processor, when executing the BIOS, identify a present rotation state of the computer system by an interrupt signal and an internal communication scheme,
the processor, when executing the BIOS, establishes a data structure in accordance with a virtual scan code and the rotation state and transmits the data structure to the OS, wherein the virtual scan code is a preset identification code denoting that the computer system is rotated,
the processor, when executing the OS, controls a program to execute a related operation of the rotation state in accordance with the data structure,
wherein when the computer system starts running, the processor, when executing the BIOS, defines a first specific address range in the main memory to serve as the internal communication scheme,
wherein the EC writes the virtual scan code and a rotation parameter corresponding to the rotation state into the first specific address range, then sends the interrupt signal to the processor executing the BIOS to inform the BIOS of reading the first specific address range and acquiring the virtual scan code and the rotation parameter.

13. The computer system according to claim 12, further comprising:
a motion sensor, coupled to the EC, wherein when detecting that the computer system is rotated, the motion sensor acquires the present rotation state of the computer system and transmits a signal corresponding to the rotation state of the computer system to the EC.

14. The computer system according to claim 13, wherein the EC parses the signal of the motion sensor to determine the present rotation state of the computer system.

15. The computer system according to claim 12, wherein the EC defines a second specific address range in an internal memory to serve as the internal communication scheme.

16. The computer system according to claim 15, further comprising:
a keyboard, coupled to the EC, wherein when the computer system receives a specific key input from the keyboard, the EC determines the present rotation state of the computer system in accordance with the specific key input, and writes the virtual scan code and a rotation parameter corresponding to the rotation state of the computer system into the second specific address range.

17. The computer system according to claim 16, wherein the OS commands the EC through the BIOS to read the second specific address range in accordance with the interrupt signal sent by the EC, and
the EC returns the virtual scan code and the rotation parameter recorded in the second specific address range to the BIOS.

18. The computer system according to claim 14, wherein the BIOS fills the virtual scan code in a first preset area of a buffer area and fills the rotation parameter in a second preset area of the buffer area, wherein the buffer area is taken from the main memory.

19. The computer system according to claim 18, wherein the program is a display application, the OS transmits the data structure to the display application, and the display application determines the rotation state of the computer system in accordance with the rotation parameter filled in the data structure, and calls a display application interface to rotate a screen image of the computer system in accordance with the rotation state.

20. The computer system according to claim 18, wherein the program is a sound card driver, the OS transmits the data structure to the sound card driver, then the sound card driver determines the rotation state of the computer system according to the rotation parameter filled in the data structure and informs a sound chip of actuating a first set of microphones or a second set of microphones configured in the computer system in accordance with the rotation state, wherein the first set of microphones is configured on two vertical sides of the computer system when not rotated, and the second set of microphones is configured on two horizontal sides of the computer system when not rotated.

21. The computer system according to claim 17, wherein the BIOS fills the virtual scan code in a first preset area of a buffer area and fills the rotation parameter in a second preset area of the buffer area, wherein the buffer area is taken from the main memory.

22. The computer system according to claim 21, wherein the program is a display application, the OS transmits the data structure to the display application, and the display application determines the rotation state of the computer system in accordance with the rotation parameter filled in the data structure, and calls a display application interface to rotate a screen image of the computer system in accordance with the rotation state.

23. The computer system according to claim 21, wherein the program is a sound card driver, the OS transmits the data structure to the sound card driver, then the sound card driver determines the rotation state of the computer system according to the rotation parameter filled in the data structure and informs a sound chip of actuating a first set of microphones or a second set of microphones configured in the computer system in accordance with the rotation state, wherein the first set of microphones is configured on two vertical sides of the computer system when not rotated, and the second set of microphones is configured on two horizontal sides of the computer system when not rotated.

* * * * *